UNITED STATES PATENT OFFICE.

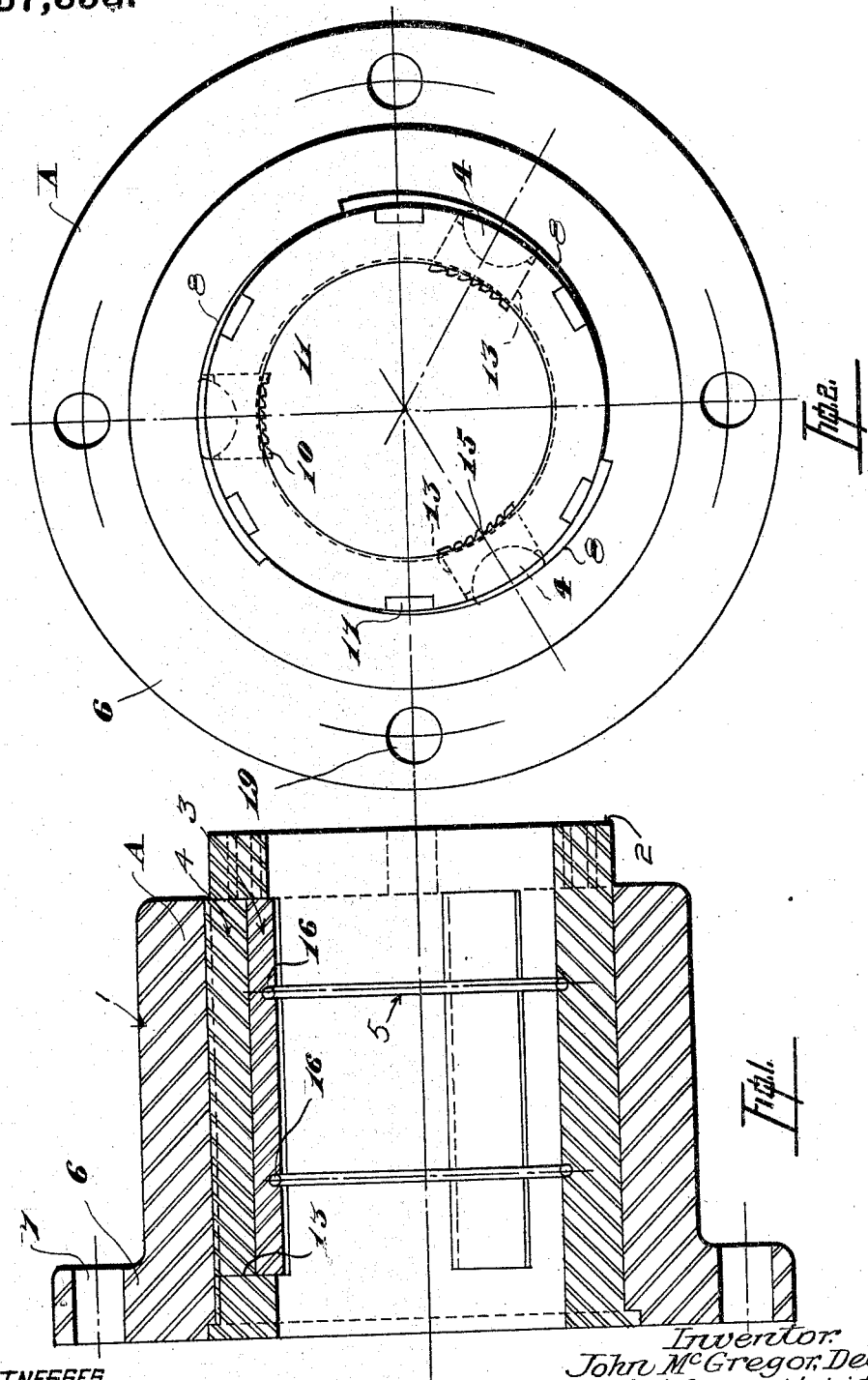

JOHN McGREGOR, DECEASED, LATE OF ST. JOHN, NEW BRUNSWICK, CANADA, BY MARGARET McGREGOR, EXECUTRIX, OF ST. JOHN, NEW BRUNSWICK, CANADA.

EXTERNAL-COMPRESSION SELF-TIGHTENING CHUCK.

1,237,353.          Specification of Letters Patent.     Patented Aug. 21, 1917.

Application filed March 15, 1917. Serial No. 155,129.

*To all whom it may concern:*

Be it known that I, MARGARET McGREGOR, of the city of St. John, in the county of St. John, Province of New Brunswick, and the Dominion of Canada, am the executrix of JOHN McGREGOR, of the said city of St. John, who in his lifetime invented new and useful Improvements in External-Compression Self-Tightening Chucks, of which the following is a specification.

This invention relates to improvements in chucks and the objects of the invention are to facilitate gripping the outer periphery of a piece of work being turned and automatically self-center the same, to permit of the jaws forming part of the chuck being simultaneously actuated, to resiliently control the return of the jaws to a normal position, to simplify the chuck and render it capable of being utilized on lathes having either solid or hollow machine spindly and generally to adapt the several parts to better perform the functions required of them.

With these and other objects in view, the invention consists essentially of the improved construction particularly described and set forth in the following specification and accompanying drawings forming part of the same.

In the drawings,

Figure 1 is a longitudinal section of the improved chuck.

Fig. 2 is an end view of the same.

Like characters of reference refer to like parts in the several figures.

Referring to the drawings, A represents the improved chuck comprising the body portion 1, formed hollow and provided at one end with a radial flange 6, having orifices 7 therethrough to permit the said body being secured to the face plate of a lathe.

The body portion is provided on the inner wall with equidistantly spaced cam faces 8, designed to coact with the adjusting members 4, the outer face of which is curvilinear having substantially the same radius of curvature as the cam faces 8, the inner face of the adjusting member being substantially semi-circular as shown at 10, and adapted to engage with the semi-circular recesses 11, formed in the outer face of the jaws 3, which are slidably mounted in the slots 13 formed in the sleeve 2, which is rotatably mounted in the body 1.

The inner face of the jaws 12 is provided with serrations 15 and formed with recesses 16, with which the resilient rings 5 engage to return the jaws to a normally extended position.

The outer end of the sleeve is provided with a plurality of radial sections 17, adapted to be engaged by a spanner and so facilitate in loosening the jaws from the object or objects being held therein in a manner to be made clear hereafter.

When the chuck is in use, the work to be turned is located in the sleeve 14, which may then be given a turn by the hand causing the cam faces 8 to engage with the outer face of the adjusting members 4, so displacing the jaws 3 radially inwardly to engage the piece of work and on starting the machine the resistance to cutting will tend to further tighten the chuck on the piece of work.

When the work has been completed and it is desired to remove the same from the chuck, it is only necessary to engage a spanner with the recess 17, when the sleeve 2 is rotated permitting the resilient rings 5 to engage the jaws 3 from the piece of work which is then manually or otherwise removed.

From this description it will be seen that he has invented a chuck which may be advantageously employed on munitions and the like and whereby the output of the machine will be greatly increased since the time saved in automatically self-centering the work will greatly accelerate the output.

As many changes could be made in the above construction and many apparently widely different embodiments of his invention within the scope of the claims, constructed without departing from the spirit or scope thereof, it is intended that all matter contained in the accompanying specification and drawings shall be interpreted as illustrative and not in a limited sense.

What is claimed as the invention is:

1. In a chuck and in combination, a hollow body portion provided with a plurality of equidistantly spaced cam faces in its inner wall, a sleeve rotatably mounted in the body having a plurality of notches in its outer end and provided with a plurality of equidistantly spaced radially extending orifices therethrough, jaws slidably mounted in the orifices provided on the outer end with a semi-circular recess, adjusting members having an inner wall semi-circular and an outer wall formed with the same radius of curvature as the cam faces, adapted to engage with the jaws and cam faces respectively, and resilient means for retaining the jaws in a normally extending position.

2. In a chuck and in combination, a hollow body portion having a plurality of equidistantly spaced cam faces in its inner wall, a sleeve rotatably engaging with the body portion provided with a plurality of equidistantly spaced and radially extending orifices therethrough, jaws slidably engaging with the orifices provided on the inner end with serrations and on the outer end with semi-circular recesses, adjusting members having the inner wall semi-circular and the outer wall formed with the same radius of curvature as the cam faces and designed to engage with the jaws and cam faces respectively, and spring rings located in the inner end of the sleeve adapted to normally retain the jaws in an extended position.

In testimony whereof I have signed at the town of New Glasgow, Nova Scotia, this 4th day of June, A. D. 1917.

MARGARET McGREGOR,
*Executrix of the late John McGregor.*

In the presence of—
JOHN BULL,
IRENE L. MARSHALL.

Copies of this patent may be obtained for five cents each, by addressing the "Commissioner of Patents, Washington, D. C."